(12) United States Patent
Ishii

(10) Patent No.: US 6,170,637 B1
(45) Date of Patent: Jan. 9, 2001

(54) ARTICLE FEEDING APPARATUS

(76) Inventor: Toru Ishii, 66 Takaokacho, Matsuyama, Ehime (JP)

( * ) Notice: Under 35 U.S.C. 154(b), the term of this patent shall be extended for 0 days.

(21) Appl. No.: 09/188,789

(22) Filed: Nov. 7, 1998

(51) Int. Cl.[7] .............................. B65G 47/12; B65G 13/02
(52) U.S. Cl. ............................................ 198/443; 198/785
(58) Field of Search .................................... 198/784, 785, 198/443

(56) References Cited

U.S. PATENT DOCUMENTS

| | | | |
|---|---|---|---|
| 1,863,520 | * 6/1932 | Camerota | 198/785 |
| 3,386,559 | * 6/1968 | Ross et al. | 198/443 |
| 5,052,543 | * 10/1991 | Hagan | 198/785 |

* cited by examiner

*Primary Examiner*—Robert P. Olszewski
*Assistant Examiner*—Bryan Jaketic
(74) *Attorney, Agent, or Firm*—Moonray Kojima

(57) ABSTRACT

The invention relates to an article feeding apparatus for arraying and feeding articles having nearly spherical shape or nearly elliptical shape such as fruits and balls for sports, and more particularly to an article feeding apparatus comprising support rollers arranged in a conveying direction, with the support rollers being arranged at an angle of a nearly V form large in the opening angle as seen from the plane toward said conveying direction, and rotating means for rotating the support rollers in an article transferring direction, in which the articles are centered in the central part of the conveying route, the articles conveyed in overlaid or gathered state are dispersed back and forth, a transfer force is applied in a direction moving toward the central part of the conveying route, and the articles are transferred to next process accurately and securely one by one while maintaining the centered state of the articles.

8 Claims, 8 Drawing Sheets

ARTICLE FEEDING APPARATUS

BACKGROUND OF THE INVENTION

1. Field of the Invention

The present invention relates to an article feeding apparatus for arraying and feeding articles having nearly spherical shape or nearly elliptical shape, such as fruits including orange, apple, tomato, water melon, pear, persimmon, peach and potato, or balls for sports including tennis, soccer, baseball and table tennis.

2. Description of the Prior Art

Hitherto, as an apparatus for feeding fruits, as shown in FIG. 7, there was an apparatus for mounting fruits A . . . between dispersion belts 30, 30 stretched in a V-form opened upward, arraying the fruits A . . . while dispersing back and forth by the dispersion belts 30, 30 to transfer onto an array belt 31, and moving the fruits A . . . sequentially from the array belt 31 to a sorting conveyor 33.

However, if the surface of the fruit A is coated with polishing wax, the contact resistance between the fruit A and the dispersion belt 30 is large, and it is hard to disperse the fruit A mounted between the dispersion belts 30, 30 back and forth, or correct the mounting position of the fruit A.

The fruit A having a nearly elliptical shape is large in contact area with the dispersion belt 30, and it may be conveyed in a state contacting with one dispersion belt 30 only, and the fruit A may not be arrayed and mounted in the center of the conveying route.

Further, if attempted to center (align) the fruit A put on the array belt 31 by means of guide plates 32 stretched at both sides, since the contact resistance is large, the fruit A is only inclined or erected, and it is hard to correct its mounting position.

Accordingly, since the fruit A is mounted in an offset state to the central mounting surface of the sorting conveyor 33, or the fruit A is mounted in an erect state, it is hard to inspect or take the entire surface of the fruit A by camera or the like, and the sorting job cannot be done accurately.

Or, due to the contact resistance between adjacent fruits A . . . , or contact resistance against the guide plate 32, some of the fruits A . . . are conveyed in a gathered state, or the interval of the fruits A mounted back and forth may be irregular, and it was difficult to keep constant the interval and number of fruits A.

Other feeding method is shown in FIG. 8, in which a dispersion conveyor 35 is oscillated by a vibration generator 34 disposed in the lower part of the conveying route, and the fruits A . . . mounted on the dispersion conveyor 35 are dispersed back and forth and transferred onto an array conveyor 36, and are sequentially transferred from the array conveyor 36 to a sorting conveyor 33, but by using such apparatus, since the contact area with the dispersion conveyor 35 varies with the size, shape and kind of the fruits A, the feed speed is fast when the contact area is large and the feed speed is slow when the contact area is small, and it was hard to maintain constant the feed rate of the fruits A.

SUMMARY OF THE INVENTION

It is hence a primary object of the invention to present an article feeding apparatus capable of rotating support rollers arranged in a nearly V form wide in the opening angle as seen from the plane toward the conveying direction (hereinafter abbreviated merely as a nearly V form in plane view) in the conveying direction by rotating means, centering articles put on the support rollers to the central part of the conveying route, dispersing the articles conveyed in overlaid or gathered state back and forth, applying a transfer force positively in the direction moved toward the central part of the conveying route, and maintaining the centering state of articles, so that the articles may be transferred accurately and securely one by one, for example, onto the central mounting surface of the sorting conveyor.

It is another object of the invention to present an article feeding apparatus capable of conveying objects while moving positively toward the central part of the conveying route by means of support rollers of a wide angle arranged at the start end side, and preventing contact of the articles with the guide members disposed at both sides of the conveying route or blocking of their conveyance, so that articles of arbitrary size may be dispersed or arrayed easily.

It is a different object of the invention to present an article feeding apparatus capable of rotating the support rollers at the start end side fast, and conveying in the conveying direction while moving the articles contacting with the support rollers toward the central part of the conveying route, so that multiple articles can be dispersed and arrayed back and forth efficiently, thereby enhancing the feeding capability.

It is a further object of the invention to present an article feeding apparatus for disposing support rollers at both sides so that the angle may be smaller gradually toward the conveying direction, whereby the transfer force in the conveying direction increases gradually, the transfer force in the width direction attenuates, transverse drift of articles decreases, and the feeding position and feeding posture of articles are stabilized.

It is a further different object of the invention to present an article feeding apparatus for arranging support rollers in a slant so as to be higher from the central part of the conveying route toward both sides, and conveying articles while moving toward the central part of the conveying route along the slope of the support rollers, so that the articles may be centered securely by rotation and inclination of the support rollers.

It is a still different object of the invention to present an article feeding apparatus for providing a support roller in the middle position with a slip allowing function, stopping the articles on the conveying route temporarily, causing the succeeding articles to contact sequentially, and arraying and conveying the front and rear articles in contact or close state by the transfer force given at the time of this contact.

It is another different object of the invention to present an article feeding apparatus capable of rotating a support roller at terminal end side fast, accelerating and conveying the arrayed articles toward the conveying direction, separating multiple articles back and forth, and supplying into next process.

It is another different object of the invention to present an article feeding apparatus capable of supplying the arrayed articles to next process remaining in the centered state along plural guide rollers arranged at the terminal end portion of the conveying route, and transferring the articles securely, for example, on the central mounting surface of the sort conveyor, and transferring the articles smoothly, if the surface of articles is coated with wax, without allowing stagnant flow of articles by the small contact resistance of the guide rollers.

Further objects of the invention will be more clearly understood from the following description of the preferred embodiment thereof.

DESCRIPTION OF THE PREFERRED EMBODIMENT

A preferred embodiment of the invention is described in detail below while referring to the accompanying drawings.

Figure 1:
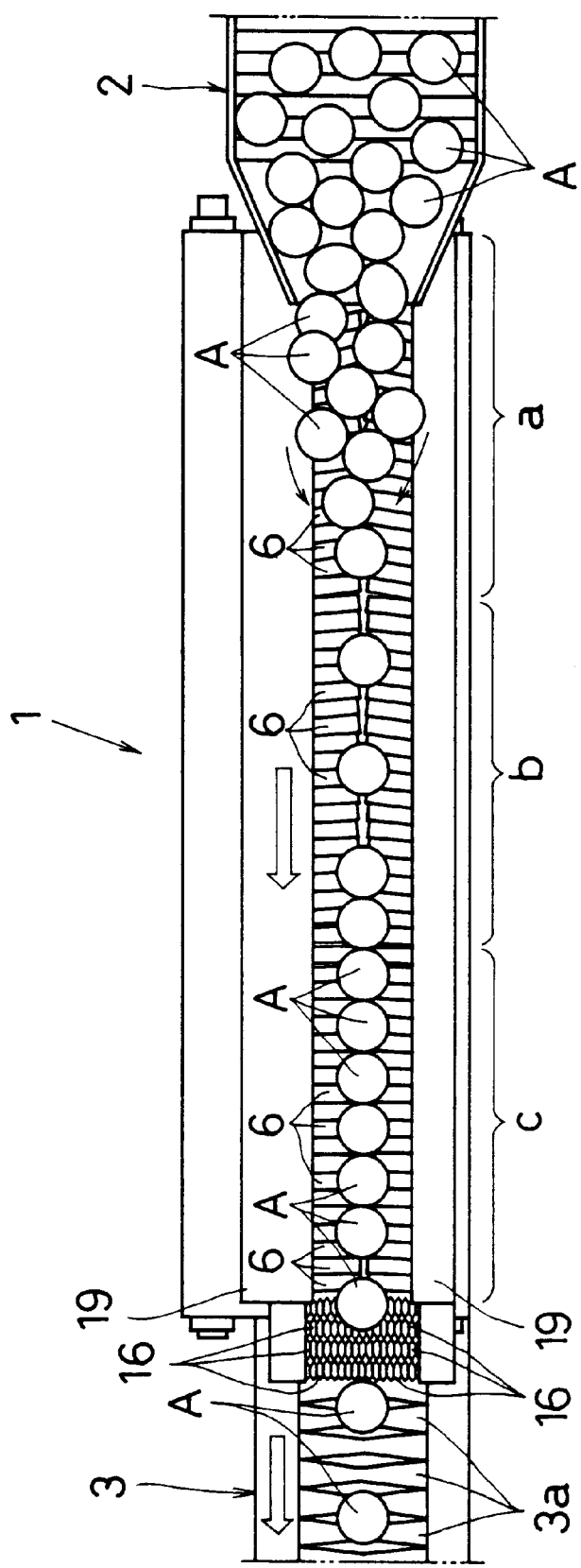
FIG. 1 is a plan view showing an article feeding apparatus of the invention.
Figure 2:
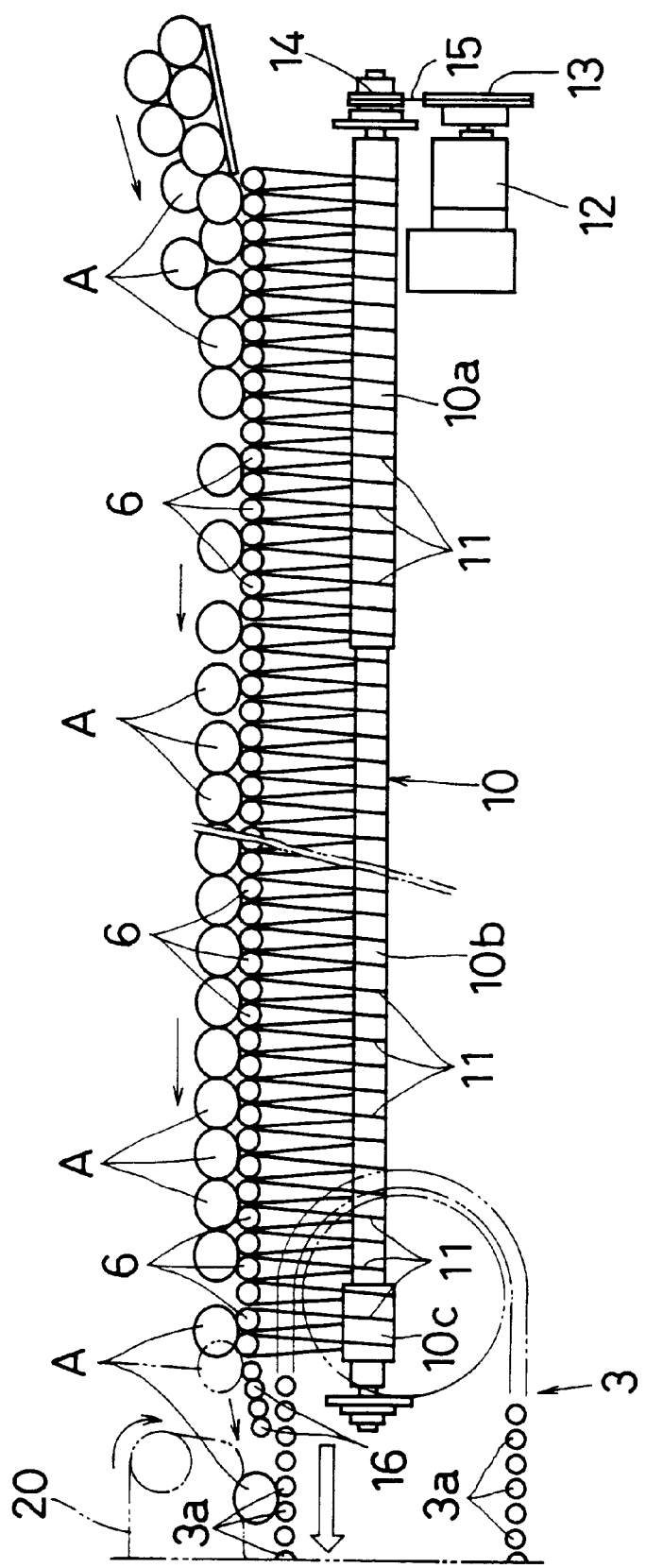
FIG. 2 is a side view of the same.

The drawings show fruits as an example of articles, relating to an article feeding apparatus for arraying and feeding multiple fruits one by one, and in FIG. 1 and FIG. 2, this article feeding apparatus 1 is located between a loading conveyor 2 disposed at the front stage of the conveying route, and a sorting conveyor 3 disposed at the rear stage of the conveying route, and multiple fruits A supplied from the loading conveyor 2 are dispersed back and forth, and arranged in the central part of the conveying route (for example, in a row), and are transferred, one by one, onto the central part of the rollers 3a . . . for composing the sorting conveyor 3.

Figure 3:
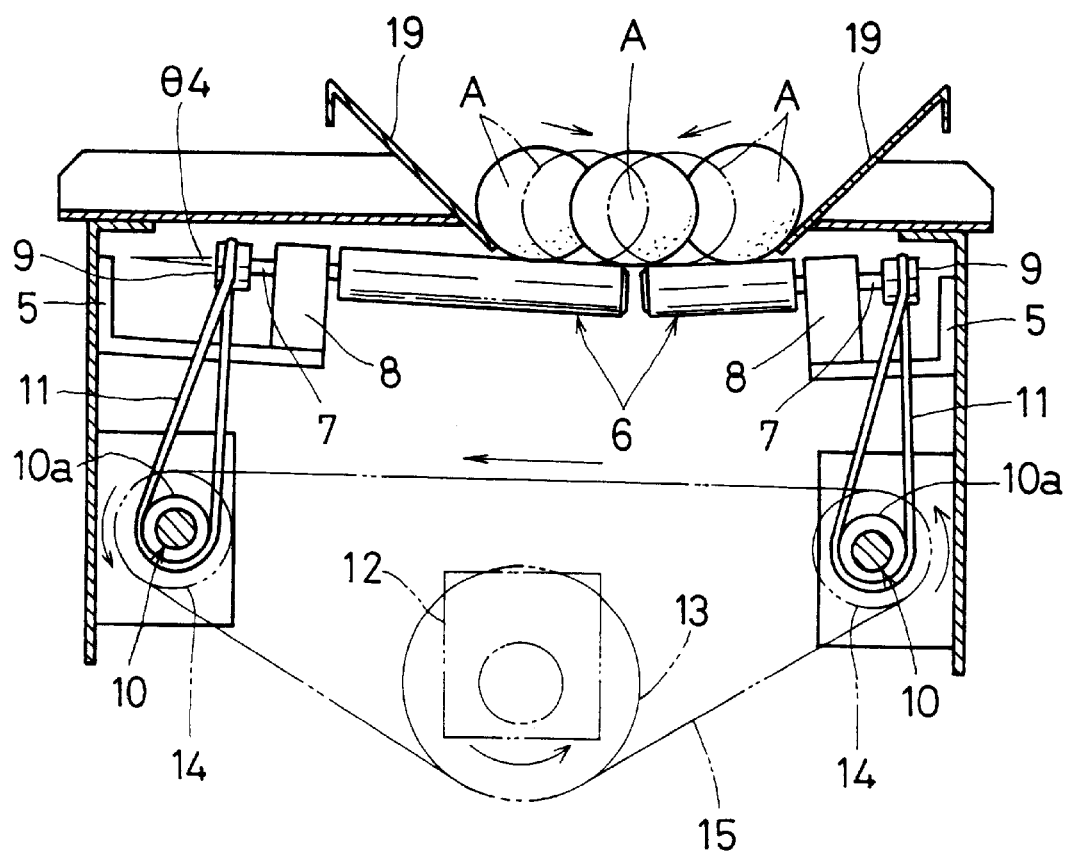
FIG. 3 is a front view showing a centering action of articles.
Figure 4:
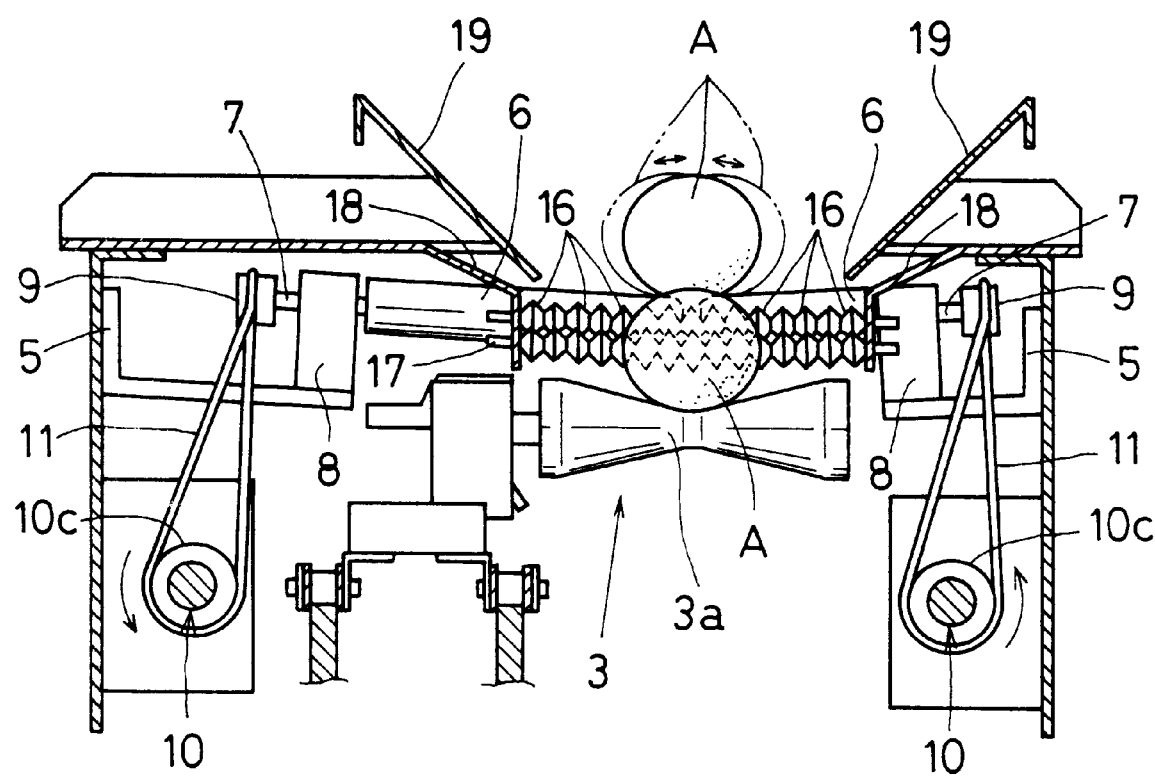
FIG. 4 is a front view showing a transfer action of articles.

In this article feeding apparatus 1, as shown in FIG. 3 and FIG. 4, hollow or solid support rollers 6 of same diameter are rotatably supported between mounting frames 5, 5 stretched at both sides of the conveying route, and multiple support rollers 6 are arranged longitudinally at intervals in the conveying direction so as to mount fruits A of arbitrary sizes (for example, large, medium and small sizes), and also support rollers 6 . . . of regions a, b, c supported at both sides of the conveying route are disposed in a nearly V form in plane view in the conveying direction (for example, the inner side of the support rollers 6 is delayed and the outer side is advanced in the conveying direction).

In this embodiment, long support rollers 6 are arranged at one side of the conveying route, and short support rollers 6 are arranged at other side of the conveying route, but, alternatively, support rollers 6 of same length may be arranged at both sides of the conveying route.

The support rollers 6 are formed of synthetic resin, metal, wood, etc., and the outer surface of the rollers is formed in a shape of same outside diameter from the free end to the base end (for example, cylindrical shape, columnar shape). Incidentally, the outer surface of the roller may be formed also in a shape increasing in diameter from free end to base end (for example, conical shape).

Further, on the outer surface of the support rollers 6, portions for applying contact resistance such as protrusions or bumps may be formed or added, or the roller surface may be formed or covered with a member of large contact resistance such as synthetic rubber.

The support roller 6 has the base end of a support shaft 7 fixed at its axial center supported rotatably by a bearing 8 fixed on the mounting frame 5, and stretches a drive belt 11 (for example, circular belt) between a pulley 9 fixed at the base end of the support shaft 7 and a rotary shaft 10 laid down in the lower part of the both sides of the conveying route (for example, stretched by crossing in a figure of 8).

A driving motor 12 with a reduction gear disposed in the lower part at the start end synchronously rotates two rotary shafts 10, 10 through sprockets 13, 14 and a drive chain 15, and transmits a torque to the support shaft 7 through the drive belt 11, and rotates the support rollers 6 disposed at both sides of the conveying route in the conveying direction.

The support roller 6 at the start end has the drive belt 11 stretched on the shaft 10a of large diameter formed on the shaft peripheral side at the start end of the rotary shaft 10, and rotates fast in a direction of moving (centering) the fruits A positively toward the central part of the conveying route.

The support roller 6 in the middle has the drive belt 11 stretched on the shaft 10b of small diameter formed on the shaft peripheral side in the middle of the rotary shaft 10, and rotates at a lower speed than the rotating speed of the support rollers 6 arranged at the start end and terminal end. The support rollers 6 are provided so as to slip when a larger resistance than the torque by the rotary shaft 10 is given. For example, by slipping between the support roller 6 and support shaft 7, or rotary shaft 10 and drive belt 11, the conveying speed of the fruits A is decreased or conveying is stopped, so that the fruits A are temporarily kept on the conveying route.

The support roller 6 at the terminal end has the drive belt 11 stretched on the shaft 10c of largest diameter formed on the shaft peripheral side in the terminal end of the rotary shaft 10, rotates at a higher speed than the rotating speed of the support rollers 6 arranged at the start end and in the middle, accelerates and conveys the fruits A mounted on the support rollers 6 in the conveying direction, separates the fruits A arrayed in the central part of the conveying route at equal intervals in the longitudinal direction, and transfers one by one to put between the receiving rollers 3a . . . of the sorting conveyor 3.

In this embodiment, due to the difference in outside diameter of the shafts 10a, 10b, 10c of different diameters formed on the rotary shaft 10, the rotary speed of the support rollers 6 can be varied, but it is also possible to vary the rotating speed of the support rollers 6 by changing the outside diameter of the pulleys 9 fixed to the support shafts 7 of the support rollers 6.

As other rotating methods, in the support rollers 6 stretched in the overall length or part of the conveying route, the chain may be stretched to the base end of the support shaft 7 through a sprocket, it may be designed to rotate and drive independently or by interlock by rotating means for incorporating the motor into or directly coupling to the roller, or it may be intended to rotate by pressing members such as belt and rubber roller to the peripheral surface of the support roller 6.

Moreover, the rotating speed of the support rollers 6 arranged in the start end, middle, and terminal end positions may be set at different speed or same speed, and when setting the speed, the support roller 6 at the star tend is set at a fast speed than the support rollers 6 disposed at other positions.

Figure 5:
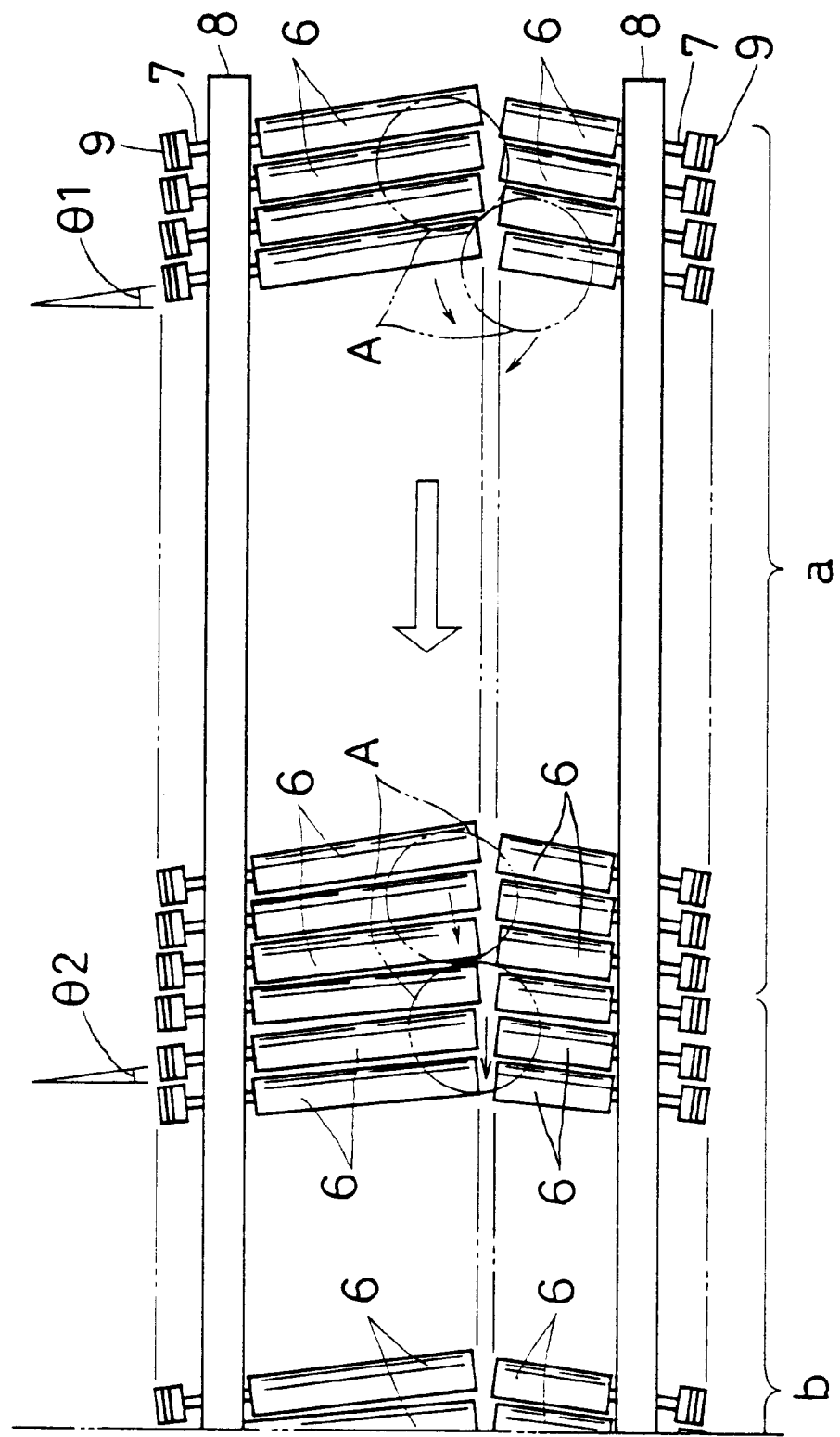
FIG. 5 is a plan view showing a mounting state of support rollers arranged at start end.
Figure 6:
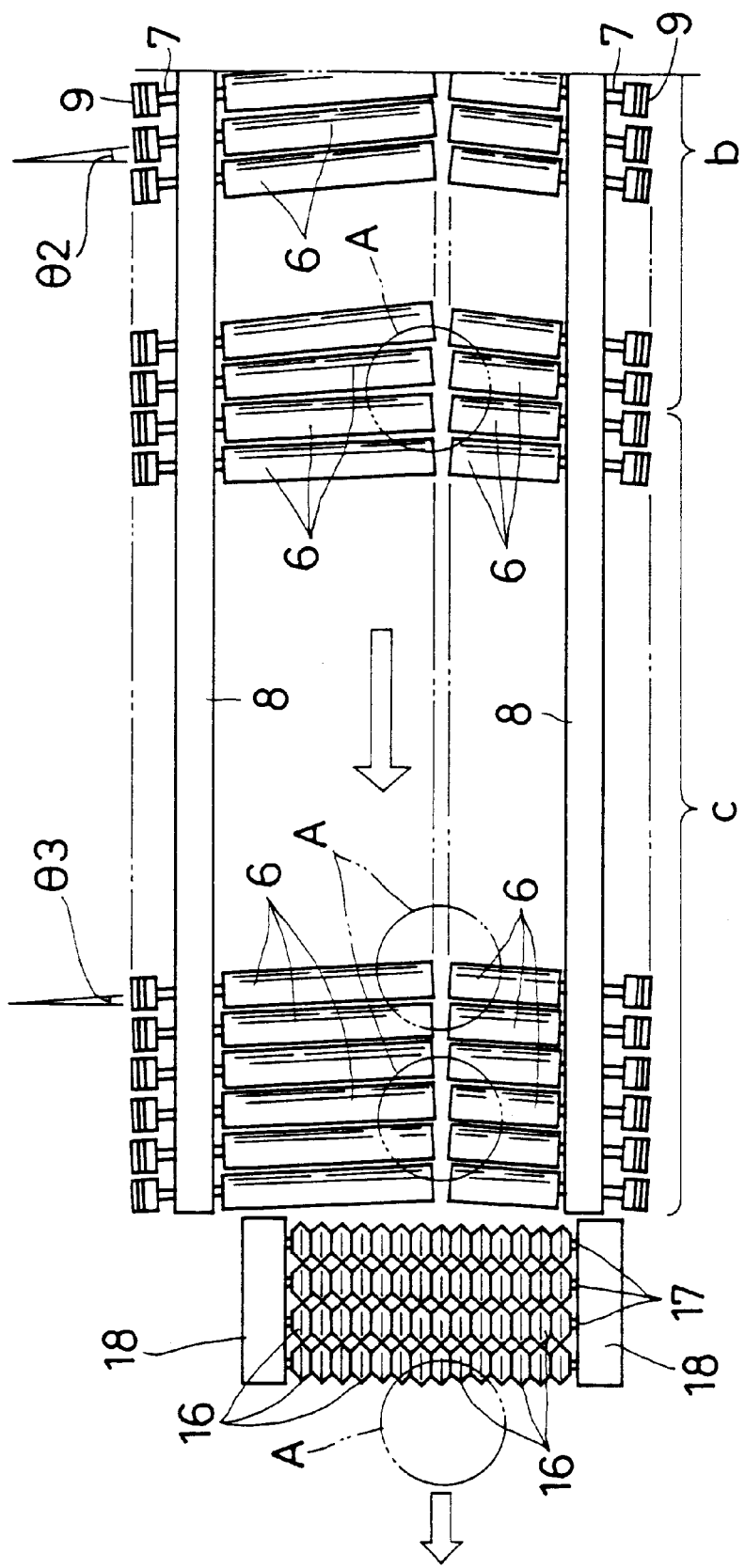
FIG. 6 is a plan view showing a mounting state of support rollers arranged at terminal end.
Figure 7:
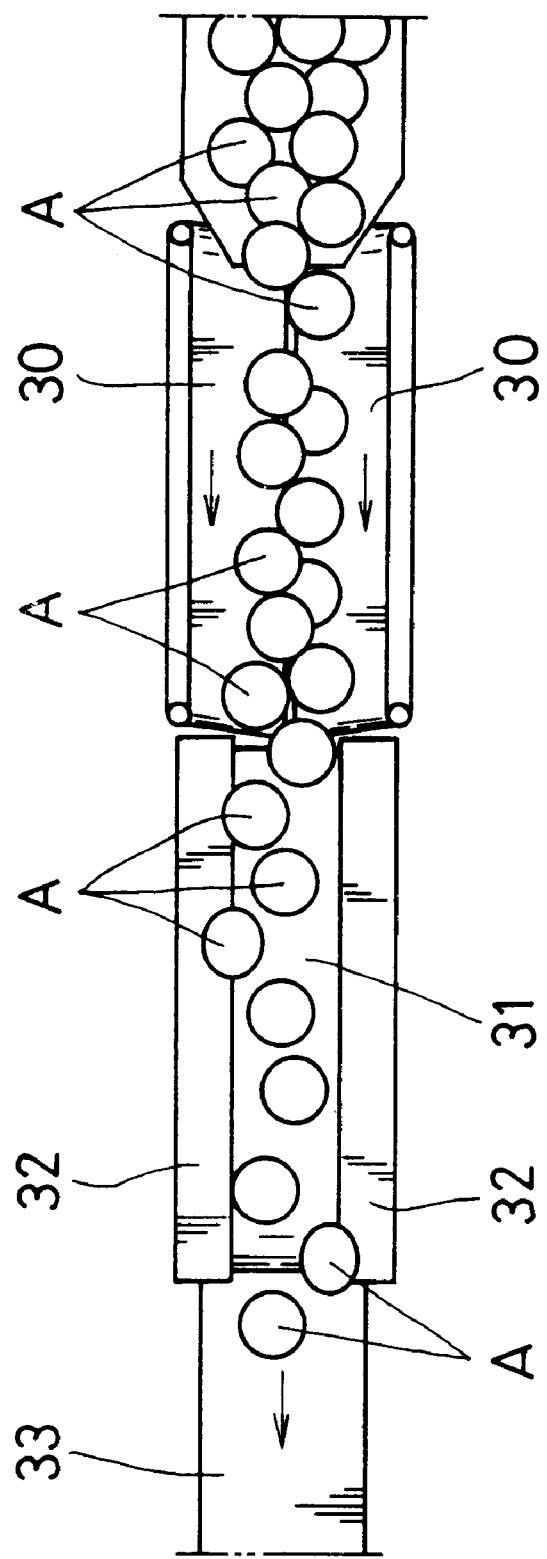
FIG. 7 is a plan view showing a conventional feeding apparatus.
Figure 8:
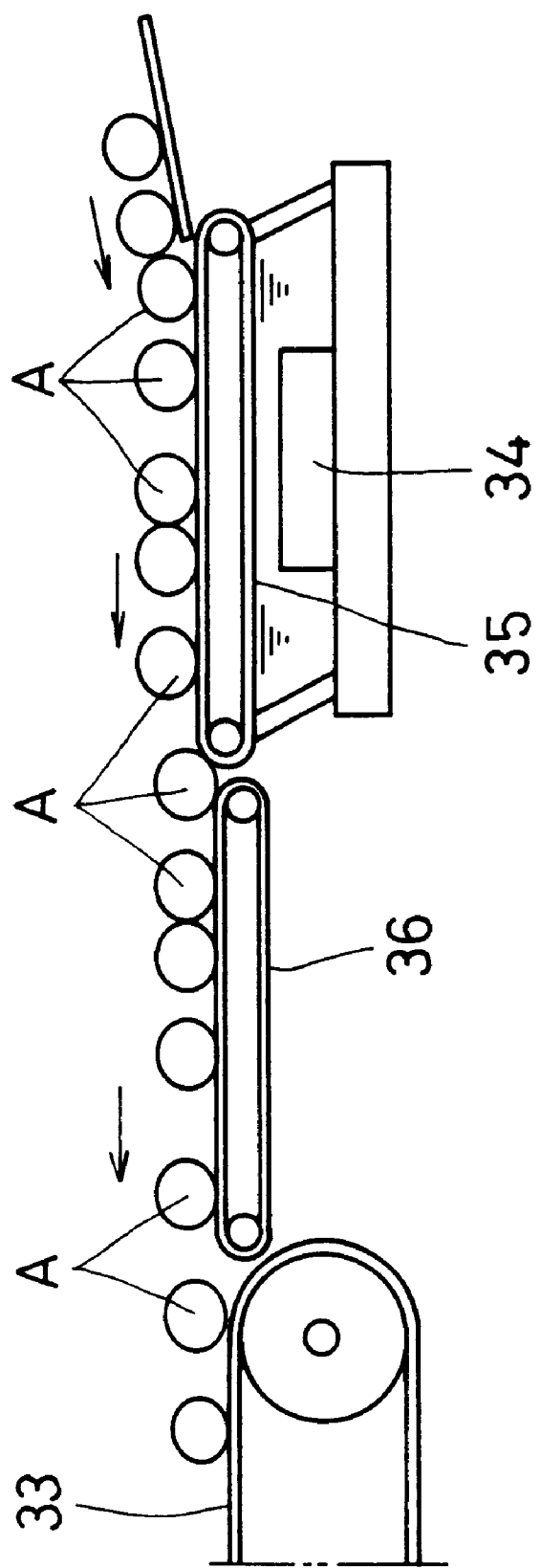
FIG. 8 is a side view showing a conventional feeding apparatus.

The support rollers 6 disposed in regions a, b, c on the conveying route are arranged, as shown in FIG. 5 and FIG. 6, so that the angles θ1, θ2, θ3 (becoming moderate in the sequence of regions a, b, c) may be gradually smaller toward the conveying direction (θ1>θ2>θ3), and the fruits A are moved (centered) toward the central part of the conveying route mounted on the support rollers 6.

In this embodiment, the support roller 6 disposed in the region a at the start end is set at a large angle θ1 (for example, about 13 degrees), the support roller 6 disposed in the region b in the middle is set at an angle θ2 smaller than the angle θ1 and larger than angle θ3 mentioned below (for example, about 8 degrees), and the support roller 6 disposed at the region c at the terminal end is set at angle θ3 smaller than the angle θ2 (for example, about 3 degrees).

Incidentally, the support rollers 6 arranged in the regions a, b, c may be changed to arbitrary angles (angles θ1, θ2, θ3). Alternatively, the support rollers 6 may be combined and arranged in angles θ1, θ3, angles θ1, θ2, and angles θ2, θ3, or the support rollers 6 may be arranged in any one set of angles θ1, θ2, θ3.

In all regions a, b, c, the support rollers 6 at both sides are arranged in a slant at an angle θ4 (for example, 3 degrees) becoming higher from the central part of the conveying route to the both ends of the conveying route as shown in FIG. 3, and the fruits A put on the support rollers 6 are moved (centered) toward the central part of the conveying route. This angle (θ4) may be changed freely.

At the terminal end of the conveying route, closely to the support rollers 6 arranged at the terminal end, a plurality of guide rollers 16 . . . formed in arbitrary shape including trapezoidal, spherical, elliptical and other shapes may be arranged in the width direction, and plural rows are arranged so as to be lower gradually toward the conveying direction.

The guide rollers 16 have support shafts 17 inserted in their axial center mounted on support frames 18 stretched in both side parts at the terminal end, and are arranged to be gradually higher from the central part of the conveying route to both sides of the conveying route, and are inclined at an angle for transferring and guiding the fruits A toward the receiving rollers 3a . . . for composing the sorting conveyor 3, so that the fruits A arrayed in the central part of the conveying route are transferred and guided toward the central part of the receiving rollers 3a . . .

In the upper part at both sides of the conveying route, conveying guides 19 inclined at interval and angle for centering and guiding the fruits A toward the central part of the conveying route are stretched. The conveying guides 19 may be stretched only at both sides at the start end of the conveying route, or if the conveying guides 19 are eliminated, the fruits A can be arrayed in the central part of the conveying route.

The illustrated embodiment is thus constituted, and its action is explained below.

First, as shown in FIG. 1 and FIG. 2, multiple fruits A released onto the loading conveyor 2 are conveyed while being dispersed longitudinally and laterally, and are sequentially transferred onto the support rollers 6 . . . arranged at both sides at the start end of the article feeding apparatus 1.

In succession, as shown in FIG. 3 and FIG. 5, by rotating fast the support rollers 6 . . . of large angle θ1 disposed in the region a at the start end, the fruits A are moved (centered) positively toward the central part of the conveying route, and the fruits A are conveyed while vibrating and oscillating, so that the fruits A conveyed in overlaid or gathered state are dispersed back and forth.

By the support rollers 6 . . . arranged in the regions b and c, the fruits A are conveyed while moving (centering) toward the central part of the conveying direction, and the fruits A put on the support rollers 6 . . . at both sides are moved toward the central part of the conveying route along the slope of the support rollers 6 . . . , and therefore a transfer force acts in the direction of moving toward the central part of the conveying route, and if the fruits A are mounted between the support rollers 6 . . . at one side, the fruits A are moved toward the central part of the conveying route along the support rollers 6 . . . , so that the fruits A . . . can be centered securely by the rotation and slope (see angle θ4) of the support rollers 6.

Moreover, since the support rollers 6 . . . disposed in the regions a, b, c are arranged so that the angle may be smaller in the sequence of the regions a, b, c toward the conveying direction (θ1>θ2>θ3), the transfer force in the conveying direction increases gradually, and the transfer force in the width direction attenuates, and therefore transverse drift of the fruits A decreases, and the feeding position and feeding posture of the fruits A are stabilized.

When the fruits A are mounted on the support rollers 6 . . . in the middle, the support rollers 6 slip due to contact resistance against the fruits A, and the fruits A are temporarily stopped on the conveying route. The succeeding fruits A sequentially contact with the stopped fruits A, and by the transfer force of this contact, the front and rear fruits A . . . are arrayed and conveyed in the contact state.

Next, when transferring the fruits A . . . arrayed in the central part of the conveying route onto the receiving rollers 3a . . . of the sorting conveyor 3, as shown in FIG. 4 and FIG. 6, by accelerating and conveying by the support rollers 6 . . . arranged at the terminal end of the region c, the fruits A . . . arrayed in a row are spaced at equal intervals back and forth, and sequentially transferred to be put in between the receiving rollers 3a . . . of the sorting conveyor 3, and the fruits A . . . arrayed in a row are transferred along the guide rollers 16 . . . arranged at the terminal end, remaining in the centering state, so that the fruits A can be transferred to the central part of the receiving rollers 3a one by one accurately and securely.

Thus, according to the article feeding apparatus of the embodiment, fruits A in arbitrary size can be conveyed while moving toward the central part of the conveying route by means of the support rollers 6 . . . arranged in the regions a, b, c, so that the fruits A . . . conveyed in overlaid or gathered stage can be dispersed back and forth.

Besides, since the support rollers 6 . . . at both sides are inclined to an angle θ4 for moving the fruits A toward the central part of the conveying route, the fruits A are moved to the central part of the conveying route along the slope of the support rollers 6 . . . , and the fruits A can be centered securely by the rotation and slope of the support rollers 6, and therefore the fruits A can be transferred accurately and securely one by one onto the central part of the receiving rollers 3a . . . for composing the sorting conveyor 3.

Moreover, as compared with the conventional belts 30, 31, the support rollers 6 have a smaller contact resistance, and it is easy to correct the position or posture of the fruits A or center them, thereby securely preventing the fruits A from being placed on the receiving rollers 3a . . . of the sorting conveyor in an eccentric state or the fruits A from being conveyed in an overlaid state, so that the fruits A can be supplied stably.

Still more, if the fruit A in a nearly elliptical shape is put on in an erect state, it is corrected to a lying position by the rotation of the support rollers 6, and therefore the face and back sides of the fruit A can be accurately and securely inspected by the eyes of the operator or by inspection means such as camera.

In addition, by rotating fast the support rollers 6 . . . large in the angle θ1 arranged at the start end and conveying by moving the fruits A positively toward the central part of the conveying route, unlike the prior art, it is possible to prevent securely disturbance of conveyance of fruits A due to contact with the guide plates, or change of position or posture of the fruits A, and the fruits A can be arrayed and dispersed efficiently, so that the supply capability may be enhanced.

Since the support rollers 6 . . . at both sides are arranged so that the angle may be smaller in the sequence of regions a, b, c (θ1>θ2>θ3), transverse drift of the fruits A is gradually smaller, and the supply position and supply posture of the fruits A transferred onto the receiving rollers 3*a* . . . of the sorting conveyor 3 are stabilized.

The support rollers 6 . . . in the middle are caused to slip when the fruits A are put on, and the succeeding fruits A contact sequentially with the fruits A stopped on the conveying route, and the front and rear fruits A are arrayed and conveyed in a contact state, thereby, unlike the prior art, preventing securely irregular intervals of the fruits A or fluctuation of the feed amount, so that the fruits A can be supplied stably.

Further, by accelerating and conveying the fruits A by the support rollers 6 . . . at the terminal end of the region c, since the fruits A . . . arrayed in a row are spaced at equal intervals, and transferred between the receiving rollers 3*a* . . . of the sorting conveyor, the face and back sides of the fruits A can be securely inspected by the inspection means, and the fruits A can be classified and sorted securely, and the sorting capability and sorting precision can be enhanced.

Furthermore, since the fruits A are guided in the direction to be transferred to the receiving rollers 3*a* . . . of the sorting conveyor 3 along the guide rollers 16 . . . arranged at the terminal end, the fruits A can be transferred correctly and securely in centered state to the receiving rollers 3*a* . . . of the sorting conveyor 3, and if the surface of the fruits A is coated with wax, since the contact resistance of the guide rollers 16 is small, stagnant flow or disturbance of conveyance of the fruits A can be securely prevented, and the fruits A can be transferred smoothly.

In the correspondence between the constitution of the invention and the aforesaid embodiment, the articles of the invention correspond to the fruits A of the embodiment, and similarly, the rotating means corresponds to the support shaft 7, pulley 9, rotary shaft 10, drive belt 11, drive motor 12, sprockets 13, 14, and drive chain 15, but it must be noted, however, that the invention is not limited to the constitution of the illustrated embodiment alone.

In the embodiment, the support rollers 6 formed in the same outside diameter are arranged at both sides of the conveying route, but support rollers 6 formed in arbitrary outside diameters (for example, large, medium and small) may be arranged in the outside diameter decreasing sequence from the start end to the terminal end of the conveying route sequentially or alternately, and therefore the fruits A . . . can be conveyed in the arrayed and centered state, so that the same action and effects as in the embodiment are obtained.

Besides, the support rollers 6 arranged in the overall length or in part of the conveying route may be set at arbitrary angles (angles θ1 to θ4).

Instead of transferring the fruits A one by one on the receiving rollers 3*a* composing the sorting conveyor 3, it may be also applied in the procedure of transferring onto the mounting parts of the receiving plates, buckets, cups, trays, or the like arranged like a keyboard, and it is not intended to be limited to the application in the embodiment alone.

Further, as shown in the virtual line in FIG. 2, the position holding belt 20 may be stretched in the upper part of the start end of the sorting conveyor 3 by relaxing in a state being pressed to the upper peripheral part of the fruits A, and the fruits A to be transferred onto the sorting conveyor 3 may be conveyed while pressing the position holding belt 20, and thus it may be constituted to prevent securely dislocation of position, posture and interval of the fruits A when transferring.

What is claimed is:

1. An article feeding apparatus comprising:

multiple support rollers arranged in the conveying direction, on a conveying route for conveying articles, at longitudinal spacing for mounting articles, with said support rollers arranged at an angle of a nearly V form large in the opening angle as seen from the plane toward said conveying direction, and rotating means for rotating the support rollers in a direction of transferring the articles toward the conveying direction, said rotating means comprising drive means connected to only ends of said support rollers disposed at the opening of said V form without any drive means being connected at ends of said support rollers disposed at the bottom of said V form so that the conveyed articles do not touch any drive means between support rollers forming each V form when conveyed by each V formed support rollers.

2. An article feeding apparatus comprising:

multiple support rollers arranged in the conveying direction, on a conveying route for conveying articles, at longitudinal spacing for mounting articles, with said support rollers arranged at an angle of a nearly V form large in the opening angle as seen from the plane toward said conveying direction, and rotating means for rotating the support rollers in a direction of transferring the articles toward the conveying direction, wherein the support rollers supported at the start end side of the conveying route are arranged so that the angle may be larger toward the conveying direction.

3. An article feeding apparatus comprising:

multiple support rollers arranged in the conveying direction, on a conveying route for conveying articles, at longitudinal spacing for mounting articles, with said support rollers arranged at an angle of a nearly V form large in the opening angle as seen from the plane toward said conveying direction, and rotating means for rotating the support rollers in a direction of transferring the articles toward the conveying direction, wherein the support rollers arranged at the start end side of the conveying route are set at a higher speed than the rotating speed of the support rollers arranged at the rear stage of the start end side.

4. An article feeding apparatus comprising:

multiple support rollers arranged in the conveying direction, on a conveying route for conveying articles, at longitudinal spacing for mounting articles, with said support rollers arranged at an angle of a nearly V form large in the opening angle as seen from the plane toward said conveying direction, and rotating means for rotating the support rollers in a direction of transferring the articles toward the conveying direction, wherein the support rollers at both sides of the conveying route are set so that the angle may be smaller gradually from the start end side toward the terminal end side of the conveying route.

5. An article feeding apparatus comprising:

multiple support rollers arrange in the conveying direction, on a conveying route for conveying articles, at longitudinal spacing for mounting articles, with said support rollers arranged at an angle of a nearly V form large in the opening angle as seen from the plane toward said conveying direction, and rotating means for rotating the support rollers in a direction of transferring the articles toward the conveying direction, wherein the support rollers at both sides of the conveying route are arranged in a slant so as to be higher from the middle to both sides of the conveying route.

6. An article feeding apparatus comprising:

multiple support rollers arranged in the conveying direction, on a conveying route for conveying articles, at longitudinal spacing for mounting articles, with said support rollers arranged at an angle of a nearly V form large in the opening angle as seen from the plane toward said conveying direction, and rotating means for rotating the support rollers in a direction of transferring the articles toward the conveying direction, wherein the support rollers arranged in the middle of the conveying route are constituted to slip when a resistance larger than the torque by said rotating means is given.

7. An article feeding apparatus comprising:

multiple support rollers arranged in the conveying direction, on a conveying route for conveying articles, at longitudinal spacing for mounting articles, with said support rollers arranged at an angle of a nearly V form large in the opening angle as seen from the plane toward said conveying direction, and rotating means for rotating the support rollers in a direction of transferring the articles toward the conveying direction, wherein the support rollers arranged at the terminal end of the conveying route are set at a faster speed than the rotating speed of the support rollers at the front stage of the terminal end side.

8. An article feeding apparatus comprising:

multiple support rollers arranged in the conveying direction, on a conveying route for conveying articles, at longitudinal spacing for mounting articles, with said support rollers arranged at an angle of a nearly V form large in the opening angle as seen from the plane toward said conveying direction, rotating means for rotating the support rollers in a direction of transferring the articles toward the conveying direction, and plural guide rollers smaller than said support rollers disposed in the width direction, closely to the support rollers arranged at the terminal end of the conveying route, wherein the guide rollers are arranged in plural rows so as to be lower gradually toward the conveying direction.

* * * * *